United States Patent [19]

Machado et al.

[11] Patent Number: 5,166,266
[45] Date of Patent: Nov. 24, 1992

[54] POLYKETONE-PHENOLIC NOVOLAC BLENDS

[75] Inventors: Joseph M. Machado, Richmond; Paul A. Westbrook, Houston, both of Tex.

[73] Assignee: Shell Oil Company, Houston, Tex.

[21] Appl. No.: 766,251

[22] Filed: Sep. 27, 1991

[51] Int. Cl.$^5$ .............................................. C08L 61/10
[52] U.S. Cl. .................................... 525/134; 524/508; 524/509; 525/154; 525/502
[58] Field of Search ................ 524/509, 508; 525/134, 525/502, 154

[56] References Cited

U.S. PATENT DOCUMENTS 4,812,522  3/1989  Handlin, Jr. ........................ 525/153
4,843,144  6/1989  Van Broekhoven et al. ...... 528/392
4,880,865  11/1989  George ............................... 524/449

OTHER PUBLICATIONS

Textbook of Polymer Science (3rd Ed.) by Fred. W. Billmeyer, Jr. pp. 436–440.
Modern Plastic Encylcopedia, 1988 (Ed) pp. 114–116.

*Primary Examiner*—Paul R. Michl
*Assistant Examiner*—Tae H. Yoon
*Attorney, Agent, or Firm*—James O. Okorafor

[57] ABSTRACT

A miscible polymer blend comprising polyketone and phenolic-based novolac polymers is provided. These blends have and exhibit improved water vapor transport properties. A process for producing these blends and articles of manufacture produced therefrom are also disclosed.

15 Claims, No Drawings

POLYKETONE-PHENOLIC NOVOLAC BLENDS

FIELD OF THE INVENTION

This invention generally relates to miscible blends of polyketones and phenolic novolacs. More particularly, this invention relates to blends of polyketone and phenolic novolacs which have good water vapor transport properties.

BACKGROUND OF THE INVENTION

Polymers of carbon monoxide and olefins generally referred to as polyketones are well known in the art.

Within this general class of polyketone polymers, this invention is particularly concerned with the sub-class comprising linear alternating polymers of carbon monoxide and at least one ethylenically unsaturated hydrocarbon. This type of polyketone polymer is disclosed in for example, U.S. Pat. No. 4,880,865, which is herein incorporated by reference.

Phenolic resins are very well known in the art. These are thermoset resins which are used in high-temperature electrical applications such as ovens and toasters, and as engineering materials.

Blends of polyketone with other polymeric materials such as polyamide (nylon), polycarbonate, polyester, and polyacetal are known in the art. Generally, these blends are immiscible polymer mixtures, which may in certain cases exhibit utility as a result of specific property advantages. Miscible blends between polyketone and poly(vinyl phenol) are also known in the art. The present invention involves polyketones and phenolic novolacs which also comprise a fully miscible blend system.

The present invention specifically relates to the use of polyketone/novolac blends in the preparation of materials having reduced permeability to water vapor. It is known in the art that polyketones possess properties set conducive to applications in packaging for food and drink. However, some applications in this area are limited by polyketone's excessive permeability to water vapor. One approach to improve polyketone's water barrier properties while experiencing minimal sacrifice in other important properties is by strategic blending with other polymers.

SUMMARY OF THE INVENTION

It is an object of the invention to provide a miscible polyketone blend of polyketone and phenolic resins.

It is a particular object of the invention to provide a miscible blend of polyketone and novolac polymers which have and exhibit improved water vapor transport properties.

Accordingly, it is now provided a miscible polymer blend comprising a linear alternating terpolymer of carbon monoxide, ethylene, and at least one ethylenically unsaturated hydrocarbon of at least 3 carbon atoms, and a phenolic-based novolac polymer, having and exhibiting improved water vapor transport properties.

DETAILED DESCRIPTION OF THE INVENTION

Generally speaking, the materials needed to practice this invention include a linear alternating polymer of carbon monoxide and at least one ethylenically unsaturated hydrocarbon (hereinafter sometimes simply referred to as polyketone) and a phenolic-based novolac polymer (hereinafter sometimes simply referred to as novolac). Still generally speaking, the practice of this invention involves the admixing of the suitable quantities of these materials under conditions that result in the formation of a blend which has improved water vapor transport properties. The term improved water vapor transport properties as used herein means that in comparison to pure polyketone, the blend has superior or better water barrier properties i.e. reduced rate of water transport.

The useful materials and the practice of this invention are further disclosed in more detail in subsequent portions of this specification.

A prudent strategy for improving the barrier properties of a given polymer is to blend that polymer with another polymer which possesses superior barrier properties. If the blend is a compatible one, then a useful material may result. However, the above strategy is not the one employed in the present invention. The novolacs of the present invention are strongly hydrophilic materials, and thus would not be expected to improve the water barrier characteristics of polyketone. The improvement which is observed is therefore highly unexpected. To rationalize the observed phenomena, it is offered as one plausible explanation that the hydrogen bonding equilibria between water and each of the two blend components govern the barrier characteristics of the blend. In the blends of the invention, the two components, polyketone and novolac, hydrogen bonds so strongly with each other that the affinity that the resultant blend has for (hydrogen bonding with) water is reduced in comparison to that of each component in its pure state.

THE POLYKETONE POLYMER

The polyketone polymers of the invention are of a linear alternating structure and contain substantially one molecule of carbon monoxide for each molecule of unsaturated hydrocarbon. Hereinafter, these polymers may sometimes be simply referred to as polyketones. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula $$\text{+CO+CH}_2\text{—CH}_2\text{)}_x\text{+CO+G)}_y$$

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO+CH$_2$C-H$_2$+ units and the —CO+G+ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]-propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

PHENOLIC-BASED NOVOLAC POLYMERS

These are generally referred to as two-step phenolics and are produced when a less-than-stochiometric amount of formaldehyde is reacted with phenol in an acidic solution to form a solid product that cannot react to completion without additional formaldehyde. The novolacs so formed are thermoplastic polyphenols. Thermoset characteristics can be imparted to these thermoplastics phenols by the addition of hexamethylenetramine (hexa), a catalyst which acts as a source of formaldehyde. Additional information on phenolic-based novolac polymers, can be obtained from the following references: Textbook of Polymer Science (3ed) by Fred W. Billmeyer, Jr., Pages 436–440; and Modern Plastic Encyclopedia, 1988 (ed) Pages 114–116. The relevant portions of these references are herein incorporated by reference.

The novolac polymers useful herein can be approximately represented by the general formula:

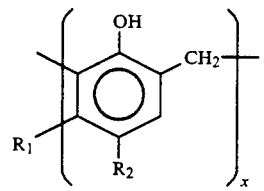

wherein $R_1$ is H, OH, or any alkyl group containing 8 carbon atoms or less and $R_2$ is H, or any alkyl group containing 8 carbon atoms or less.

These novolac polymers are exemplified by phenol-formaldehyde, resorcinol-formaldehyde, resorcinol-formaldehyde, p-butyl phenol-formaldehyde, p-ethyl-phenol-formaldehyde, p-hexyl phenol-formaldehyde, p-propyl phenol-formaldehyde, p-pentyl-phenol-formaldehyde, p-octyl-phenol-formaldehyde, p-heptyl phenol-formaldehyde and p-nonyl-phenol-formaldehyde. These various novolac polymers differ in their $R_1$ and $R_2$ substituents, melting points, viscosities, and other properties. Recommended commercial sources for obtaining these compounds include Schenectady Chemicals Company and Georgia Pacific Company.

Table A further details the various novolacs and their properties.

TABLE A

| Designation | | Novolac Polymers Used Description | $R_1$ | $R_2$ |
|---|---|---|---|---|
| HRJ 2190 | (A) | Phenol-Formaldehyde Novolac Viscosity[1], 4000 cp M.P. 110° C.[2] | —H | —H |

TABLE A-continued

| Designation | | Description | $R_1$ | $R_2$ |
|---|---|---|---|---|
| HRJ 1166 | (B) | Phenol-Formaldehyde Novolac Viscosity[1], 1100 cp M.P. 84° C.[2] | —H | —H |
| SRF 1501 | (C) | Resorcinol-Formaldehyde M.P. 105° C. | —OH | —H |
| HRJ 2901 | (D) | Cresol-Formaldehyde melting point 190° C. | —CH$_3$ | H |
| HRJ-2355 | (E) | p-butyl Phenol-Formaldehyde melting point 116° C. | —H | —(CH$_2$)$_3$CH$_3$ |
| SP-1090 | (F) | p-nonyl Phenol-Formaldehyde melting point 93° C. | —H | —(CH$_2$)$_8$CH$_3$ |
| GP-2074 | (G) | Phenol-Formaldehyde Novolac | —H | —H |

[1]Viscosity of Novolacs from cone and plate as determined by ASTM D-4287-83
[2]Melting point of Novolacs were determined by ASTM E-2867

CONVENTIONAL ADDITIVES

These additives generally include plasticizers, antioxidants, mold release agents and pigments. These additives can be added by conventional methods prior to, together with or subsequent to admixing the polymer and the mineral filler(s).

The following illustrative examples and table further detail the various aspects of this invention.

EXAMPLE 1

Preparation of Polyketone Polymer

A terpolymer of carbon monoxide, ethylene and propylene was produced in the presence of a catalyst composition formed from palladium acetate, trifluoracetic acid and 1,3-bis[di(2-methoxyphenyl)-phosphino]propane.

The terpolymer had a melting point of 220° C. and an LVN, measured in m-cresol at 60° C., of 1.75 dl/g.

EXAMPLE 2

A polyketone control (P-1000/2, MP 220C, LVN 1.75) was compression molded at 245° C. for 90 seconds and subsequently cooled to room temperature between aluminum plates to produce a 4"×4" plaque which was 0.030" in thickness.

A blend containing 90 wt % of the above polyketone and 10 wt % of a phenolic novolac (HRJ 2190 from Schenectady Chemical) was melt compounded in a Haake 30 mm co-rotating twin screw extruder operating at 250° C. and 200 RPM. The extrudate was cooled in a water bath and passed through a pelletizer. The pellets were dried under vacuum at 60° C. for 16 hrs and subsequently compression molded as described above.

The permeability of the materials to water vapor was determined using a Mocon cell with a modulated infared sensor according to the method of ASTM F 1249. Permeability was measured at 100° F. and 90% relative humidity. The results are shown in Table 1. Under these conditions, the water vapor permeability of the material is reduced by a factor of approximately four by virtue of blending with 10% HRJ 2190.

TABLE I

| Water Vapor Permeability Results | |
|---|---|
| Material | Permeability (g-mil/100 in$^{2\text{-}day}$) |
| Polyketone Control | 13.6 |
| 90/10 PK/Nov Blend | 3.6 |

EXAMPLE 3

Blends were prepared between a polyketone polymer 90/064 (MP 220C, LVN 1.1) and three novolac materials-HRJ 2190, HRJ 2355, and SP 1090. These novolacs are described in Table A. The blending was performed as described in Example 2. The compounded blends were injection molded in 7.5 oz. cups using a Krauss-Maffei 100-ton injection molding machine. The cups processed an average wall thickness of 0.027" and a surface area for permeation of 28.3 in$^2$.

The cups were filled with water, double-seamed with an aluminum lid, maintained in a 50% relative humidity environment, and weighed periodically to determine water loss over time. Some of the samples were also subjected to a retort (sterilization) cycle in a Barnstead benchtop sterilization unit with 15 psig overpressure. The retort temperature was increased until the internal temperature reached 260° F., at which point the container was slowly cooled to 150° F. The total cycle required about three hours. The water transmission rate for these containers are shown in Table 2. The transmission rate is expressed in terms of the rate at which the containers lose weight through water transport in units of percent weight lost per year.

TABLE 2

WVTR rate reduction of polyketone polymer/novolac blends. Measurement conducted on 27 mil wall thickness cups.

| MATERIAL | Control | HRJ-2190 | HRJ-2355 | SP-1090 |
|---|---|---|---|---|
| *WVTR BEFORE RETORT (Percent/Year)* | | | | |
| Polyketone 90/064 | 7.8 | | | |
| 1% novolac | | 6.4 | 7.2 | 7.5 |
| 2% novolac | | 5.5 | 6.6 | 7.7 |
| 5% novolac | | 4.0 | 5.5 | 7.2 |
| 10% novolac | | 2.5 | 4.5 | 7.1 |
| *WVTR AFTER RETORT (Percent/Year)* | | | | |
| Polyketone 90/064 | 10.8 | | | |
| 1% novolac | | 8.8 | 9.4 | 10.2 |
| 2% novolac | | 7.5 | 8.6 | 10.4 |
| 5% novolac | | 5.2 | 7.2 | 9.6 |
| 10% novolac | | 3.2 | 6.7 | 9.3 |

Table 2 demonstrates that the phenol-based novolac (HRJ 2190) is very effective with regard to reducing the rate of water transport through the container. A significant reduction in transport rate in comparison to the control is observed with only 1 wt % added novolac. At 10% novolac the rate is reduced by a factor greater than three. The butyl phenol-based novolac is someehat less efficient. At 10% modifier, the transport ratae is about 60% that of the control. The nonyl phenol novolac provided only a marginal improvement in the water transport rate. These differences in effectiveness are attributable to differences in the strength of interaction of the novolacs with the polyketone. This interaction strength decreases as the size of the alkyl group on the novolac increases, such that the nonyl novolac forms an imiscible blend with polyketone (and hence is less effective at reducing water transport rate) whereas the other novolac blends are fully miscible.

In all cases, subjecting the containers to a retort cycle causes the rate of water loss to increase. This in an effect know as "retort shock". The blends are more effective at reducing water transport after retort.

EXAMPLE 4

A polyketone polymer (91/026, MP 220° C., LVN 1.3) was blended with two different novolac resins, HRJ 2190 from Schenectady Chemical, and GP 2074 from Georgia-Pacific at levels of 5 to 15 wt %. The blends were prepared using the procedures of Example 2 and containers were fabricated and tested using the procedures of Example 3. The results are shown in Tables 3 and 4.

TABLE 3

Water Vapor Rate of polyketone/novolac blends.

| Composition (PK/Nov) | Novolac Type | WVTR (before retort) (%/yr) | WVTR (after retort) (%/yr) |
|---|---|---|---|
| 100/0 | — | 7.10 | 9.65 |
| 95/5 | GP 2074 | 4.29 | 6.13 |
| 90/10 | GP 2074 | 3.21 | 4.12 |
| 85/15 | GP 2074 | 2.65 | 3.39 |
| 90/10 | HRJ 2190 | 3.08 | 4.06 |

TABLE 4

Falling dart impact properties of polyketone/novolac containers.

| Composition (PK/Nov) | Novolac Type | Maximum Load (lbs) | Energy at Max Load (in-lb) |
|---|---|---|---|
| 100/0 | — | 89.9 | 1.32 |
| 95/5 | GP 2074 | 102.8 | 1.35 |
| 90/10 | GP 2074 | 124.2 | 1.65 |
| 85/15 | GP 2074 | 137.0 | 1.86 |
| 90/10 | HRJ 2190 | 112.1 | 1.42 |

Table 3 provides the water vapor transport data for these containers. The data in this table provide further confirmation that the rate of weight loss through water permeation is greatly diminished by virtue of blending the polyketone with minor amounts of novolac resin.

The containers could be molded without difficulty, had a good appearance and maintained good mechanical integrity. Room temperature impact resistance of polyketone polymer/novolac blends was measured on injection molded cups (0.027 inch thick) using a Dynatup 8250 impact machine. The cups were rigidly fixed in a jig such that the falling dart penetrated the bottom center of the cup. A weight of 6.23 pounds was dropped freely (no pneumatic assistance) from 3.0 feet using a tup of 0.625 inch diameter. Load as a function of time was measured and converted to load versus displacement by multiplying by the impact velocity. Impact energy was calculated from the integral of the load versus displacement curve. Both total impact energy and maximum load experienced during fracture of the cups are considered to be indicative of the relative impact resistance of the polymer blends.

Table 4 gives the force and energy required to puncture the bottom of the containers. The data show that the addition of novolac actually increases the force and energy required to puncture the containers relative to the pure polyketone control.

The combined data in Tables 3 and 4 demonstrate that the addition of novolac in relatively low amounts (up to about 15%) provides a container having improved water barrier (by a factor of 3-4) with undiminished processing characteristics and mechanical properties.

TABLE 5

| Immersion Time (days) | Control 91026 Wt (gms) | % Chg. | 10% HRJ2190 Wt (gms) | % Chg. | 5% GP2074 Wt (gms) | % Chg. | 10% GP2074 Wt (gms) | % Chg. | 15% GP2074 Wt (gms) | % Chg. |
|---|---|---|---|---|---|---|---|---|---|---|
| 0 | 3.888 | 0 | 3.801 | 0 | 3.775 | 0 | 3.895 | 0 | 3.739 | 0 |
| 2 | 3.969 | 2.086 | 3.870 | 1.818 | 3.849 | 1.955 | 3.974 | 2.023 | 3.815 | 2.030 |
| 3 | 3.969 | 2.089 | 3.872 | 1.871 | 3.853 | 2.066 | 3.975 | 2.056 | 3.817 | 2.081 |
| 4 | 3.971 | 2.143 | 3.872 | 1.876 | 3.851 | 2.002 | 3.975 | 2.051 | 3.817 | 2.086 |
| 8 | 3.973 | 2.184 | 3.872 | 1.865 | 3.850 | 1.987 | 3.974 | 2.010 | 3.815 | 2.030 |
| 26 | 3.978 | 2.328 | 3.870 | 1.823 | 3.853 | 2.058 | 3.973 | 1.995 | 3.814 | 1.992 |
| 41 | 3.981 | 2.405 | 3.868 | 1.768 | 3.854 | 2.093 | 3.971 | 1.951 | 3.811 | 1.920 |
| 57 | 3.987 | 2.552 | 3.868 | 1.771 | 3.853 | 2.066 | 3.970 | 1.913 | 3.811 | 1.918 |

Pieces of the molded containers of Example 4 were immersed in distilled water at room temperature for approximately two months. Table 5 shows the weight changes which the various materials experienced as a result of water absorption. Table 5 demonstrates that after several weeks of immersion, the blends absorb less water than the neat polyketone control. This is surprising since novolacs are known to be hydrophilic and absorb 10% or more of their weight in water (in the uncrosslinked state). This unexpected observation of reduced water absorption in the present blends is useful in itself and is related to the blends reduced water transport. It is also consistent with our hypothesis that strong hydrogen bonding between the polyketone and novolac constituents reduces the materials affinity for water.

While this invention has been described in detail for purposes of illustration, it is not to be construed as limited thereby but is intended to cover all changes and modifications within the spirit and scope thereof.

That which is claimed is:

1. A miscible polymer blend having and exhibiting improved water barrier properties comprising a linear alternating terpolymer of carbon monoxide, ethylene and one ethylenically unsaturated hydrocarbon of at least 3 carbon atoms and a phenolic-based novolac polymer.

2. A polymer blend as in claim 1 wherein said ethylenically unsaturated hydrocarbon is propylene.

3. A polymer blend as in claim 1 wherein the linear alternating terpolymer of carbon monoxide ethylene and one ethylenically unsaturated hydrocarbon of at least 3 carbon atoms has an LVN of from about 1.0 to 2.0 dl/g.

4. A polymer blend as in claim 3 wherein said ethylenically unsaturated hydrocarbon is propylene.

5. A polymer as in claim 1 wherein said phenolic-based novolac polymer is phenol-formaldehyde.

6. A polymer as in claim 1 wherein said phenolic-based novolac polymer is cresol-formaldehyde.

7. A polymer as in claim 1 wherein said phenolic-based novolac polymer is butyl-phenol-formaldehyde.

8. A polymer blend as in claim 2 wherein said phenolic-based novolac polymer is phenol-formaldehyde.

9. A polymer blend as in claim 1 wherein the novolac polymer is present in an amount of from about 1 to 20 weight percent.

10. A polymer blend as in claim 9 wherein the novolac polymer is present in an amount of from about 5 to 15 weight percent.

11. A miscible blend having and exhibiting improved water vapor properties comprising:
 a linear alternating terpolymer of carbon monoxide, ethylene and one ethylenically unsaturated hydrocarbon of at least 3 carbon atoms having an LVN of from about 1.0 to 1.5 dl/g; and
 from about 1 to 20 wt % of a phenol-formaldehyde novolac polymer.

12. A polymer blend as in claim 11 wherein said ethylenically unsaturated hydrocarbon is propylene.

13. A polymer blend as in claim 11 wherein said phenol-formaldehyde is present in an amount of from about 5 to 15 wt %.

14. A polymer blend as in claim 12 wherein said phenol-formaldehyde is present in an amount of from about 5 to 15 wt %.

15. A shaped article of manufacture produced from the polymer blend of claim 1.

* * * * *